(12) United States Patent
Yokoyama et al.

(10) Patent No.: US 11,814,708 B2
(45) Date of Patent: Nov. 14, 2023

(54) HOT DIP GALVANIZED STEEL SHEET AND METHOD FOR PRODUCING SAME

(71) Applicant: NIPPON STEEL CORPORATION, Tokyo (JP)

(72) Inventors: Takafumi Yokoyama, Tokyo (JP); Hiroyuki Kawata, Tokyo (JP); Kunio Hayashi, Tokyo (JP); Yuji Yamaguchi, Tokyo (JP); Satoshi Uchida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 286 days.

(21) Appl. No.: 17/421,317

(22) PCT Filed: Feb. 6, 2020

(86) PCT No.: PCT/JP2020/004652
§ 371 (c)(1),
(2) Date: Jul. 7, 2021

(87) PCT Pub. No.: WO2020/162562
PCT Pub. Date: Aug. 13, 2020

(65) Prior Publication Data
US 2022/0064771 A1  Mar. 3, 2022

(30) Foreign Application Priority Data

Feb. 6, 2019  (JP) .................. 2019-020058

(51) Int. Cl.
| | |
|---|---|
| C22C 38/06 | (2006.01) |
| C22C 38/58 | (2006.01) |
| C21D 8/02 | (2006.01) |
| C22C 38/00 | (2006.01) |
| C22C 38/02 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/52 | (2006.01) |
| C22C 38/54 | (2006.01) |

(52) U.S. Cl.
CPC ............ *C22C 38/58* (2013.01); *C21D 8/0205* (2013.01); *C21D 8/0226* (2013.01); *C22C 38/002* (2013.01); *C22C 38/005* (2013.01); *C22C 38/02* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C21D 2211/001* (2013.01); *C21D 2211/002* (2013.01); *C21D 2211/003* (2013.01); *C21D 2211/005* (2013.01); *C21D 2211/008* (2013.01); *C21D 2211/009* (2013.01)

(58) Field of Classification Search
CPC ................................................ C21D 2211/008
See application file for complete search history.

(56) References Cited

U.S. PATENT DOCUMENTS

| | | | |
|---|---|---|---|
| 2008/0000555 | A1 | 1/2008 | Nonaka et al. |
| 2013/0133766 | A1 | 5/2013 | Matsuda et al. |
| 2014/0242416 | A1 | 8/2014 | Matsuda |
| 2015/0203947 | A1 | 7/2015 | Hasegawa et al. |
| 2017/0107591 | A1 | 4/2017 | Takashima et al. |
| 2018/0002800 | A1 | 1/2018 | Hasegawa et al. |
| 2018/0030564 | A1 | 2/2018 | Hasegawa et al. |
| 2018/0100213 | A1 | 4/2018 | Tanaka et al. |
| 2018/0105908 | A1 | 4/2018 | Hayashi et al. |
| 2019/0330721 | A1 | 10/2019 | Hayashi et al. |
| 2020/0040420 | A1* | 2/2020 | Minami ................ C21D 1/26 |
| 2021/0207234 | A1 | 7/2021 | Takashima et al. |

FOREIGN PATENT DOCUMENTS

| | | | |
|---|---|---|---|
| JP | 2008-104532 A | 4/2006 | |
| JP | 2011-184757 A | 9/2011 | |
| JP | 2013-144330 A | 7/2013 | |
| JP | 2017-48412 A | 3/2017 | |
| JP | 2017-53001 A | 3/2017 | |
| JP | WO2016/167313 A1 | 2/2018 | |
| WO | WO 2013/051238 A1 | 4/2013 | |
| WO | WO 2014/020640 A1 | 2/2014 | |
| WO | WO 2015/151427 A1 | 10/2015 | |
| WO | WO 2016/113788 A1 | 7/2016 | |
| WO | WO 2016/113789 A1 | 7/2016 | |
| WO | WO 2016/171237 A1 | 10/2016 | |
| WO | WO 2017/179372 A1 | 10/2017 | |
| WO | WO 2018/055695 A1 | 3/2018 | |
| WO | WO-2018147400 A1 * | 8/2018 | ............... C21D 1/22 |

* cited by examiner

*Primary Examiner* — Jophy S. Koshy
(74) *Attorney, Agent, or Firm* — Birch, Stewart, Kolasch & Birch, LLP

(57) ABSTRACT

Provided are a hot dip galvanized steel sheet comprising a base steel sheet and a hot dip galvanized layer on at least one surface of the base metal steel sheet, wherein the base steel sheet has a predetermined chemical composition and contains, by volume fraction, ferrite: 0% to 50%, retained austenite: 6% to 30%, bainite: 5% or more, tempered martensite: 5% or more, fresh martensite: 0% to 10%, and pearlite and cementite in total: 0% to 5%, a number density of tempered martensite with a circle equivalent diameter of 5.0 μm or more is 20/1000 μm² or less, and an area ratio of fresh martensite with a circle equivalent diameter of 2.0 μm or more after imparting 5% plastic strain is 10% or less, and a method for producing the same.

2 Claims, 1 Drawing Sheet

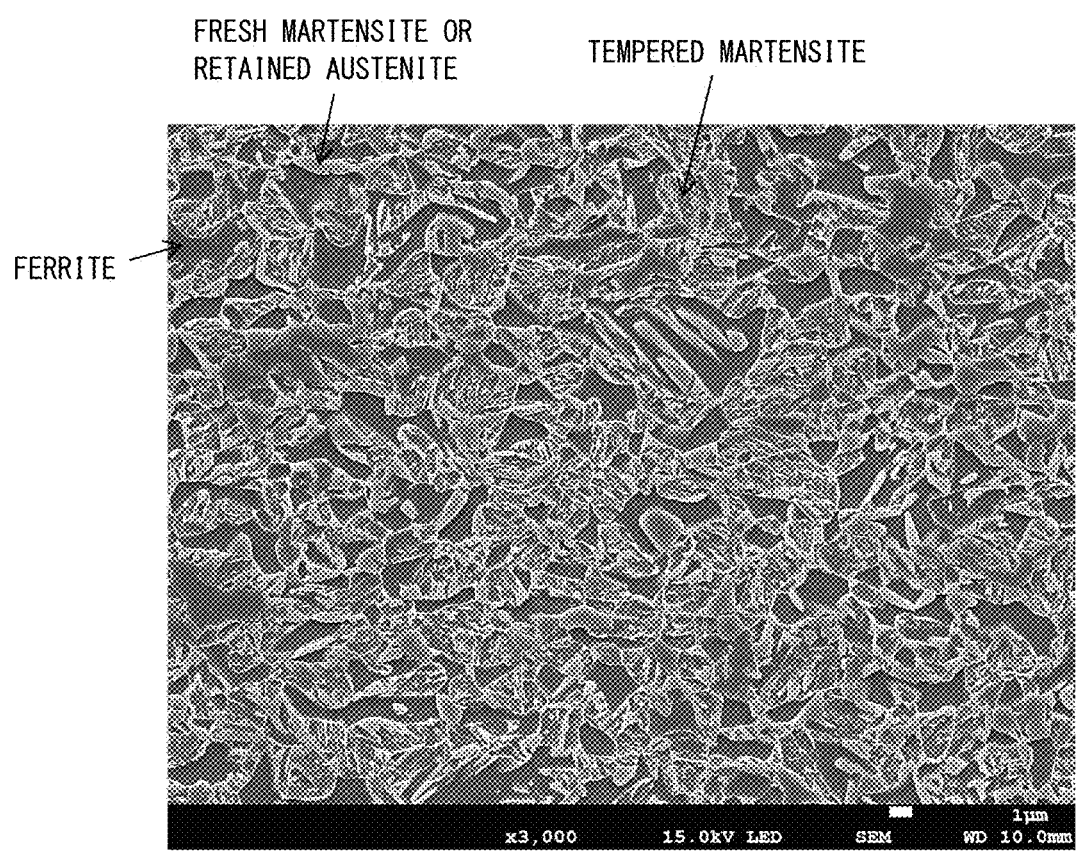

HOT DIP GALVANIZED STEEL SHEET AND METHOD FOR PRODUCING SAME

FIELD

The present invention relates to a hot dip galvanized steel sheet and a method for producing the same, mainly relates to a high strength hot dip galvanized steel sheet to be worked into various shapes by press forming etc., as a steel sheet for automobile use and a method for producing the same.

BACKGROUND

In recent years, improvement of the fuel efficiency of automobiles has been sought from the viewpoint of control of hot house gas emissions accompanying the campaign against global warming. Application of high strength steel sheet for lightening the weight of car bodies and securing collision safety has been increasingly expanding. In particular, recently, the need for ultrahigh strength steel sheet with a tensile strength of 980 MPa or more has been increasingly rising. Further, high strength hot dip galvanized steel sheet which is hot dip galvanized on its surface is being sought for portions in car bodies where rust prevention is demanded.

Hot dip galvanized steel sheet used for auto parts requires not only strength, but also press formability, weldability, and various other types of workability necessary for forming parts. Specifically, from the viewpoint of press formability, excellent elongation (total elongation in tensile test: El) and stretch flangeability (hole expansion rate: $\lambda$) are required from steel sheet.

In general, press formability deteriorates along with the higher strength of steel sheet. As means for achieving both higher strength and press formability of steel, TRIP (transformation induced plasticity) steel sheet utilizing transformation induced plasticity of retained austenite is known.

PTLs 1 to 3 disclose art relating to high strength TRIP steel sheet controlled in fractions of structural constituents to predetermined ranges and improved in elongation and hole expansion rates. Further, PTL 4 describes high strength steel sheet having a predetermined chemical composition, and including, in terms of volume fraction, 15% or less of ferrite having an average crystal grain diameter of 2 µm or less, 2 to 15% of retained austenite having an average crystal grain diameter of 2 µm or less, 10% or less of martensite having an average crystal grain diameter of 3 µm or less, and a balance of bainite and tempered martensite having an average crystal grain diameter of 6 µm or less, wherein the average number of cementite grains having a grain diameter of 0.04 µm or more existing in the bainite and tempered martensite grains is 10 or more, and describes that this high strength steel sheet has a tensile strength of 1180 MPa or more and has a high elongation and hole expandability and excellent bending workability accompanying the same.

Furthermore, TRIP type high strength hot dip galvanized steel sheet is disclosed in several literature.

Normally, to produce hot dip galvanized steel sheet in a continuous annealing furnace, it is necessary to heat the steel sheet to the reverse transformation temperature region (>Ac1), then in the middle of the process for cooling down to room temperature, dip the steel sheet in a 460° C. or so hot dip galvanizing bath. Alternatively, after cooling down to room temperature, it is necessary to again heat the steel sheet to the hot dip galvanizing bath temperature and dip the steel sheet in the coating bath. Furthermore, to produce hot dip galvannealed steel sheet, it is necessary to perform alloying treatment after dipping the steel sheet in the coating bath. For example, PTL 5 describes that the steel sheet is heated to Ac1 or more, is then rapidly cooled down to the martensite transformation start temperature (Ms) or less, is then reheated to the bainite transformation temperature region and held at the temperature region to stabilize the austenite (austemper it), and is then reheated to the coating bath temperature or alloying treatment temperature for galvannealing. However, with such a production method, since the martensite is excessively tempered in the coating and alloying step, there was the problem that the material quality became poor.

PTLs 6 to 10 disclose a method for producing hot dip galvanized steel sheet comprising cooling the steel sheet after the coating and alloying and reheating it to temper the martensite.

CITATIONS LIST

Patent Literature

[PTL 1] WO 2013/051238
[PTL 2] Japanese Unexamined Patent Publication No. 2006-104532
[PTL 3] Japanese Unexamined Patent Publication No. 2011-184757
[PTL 4] WO 2017/179372
[PTL 5] WO 2014/020640
[PTL 6] Japanese Unexamined Patent Publication No. 2013-144830
[PTL 7] WO 2016/113789
[PTL 8] WO 2016/113788
[PTL 9] WO 2016/171237
[PTL 10] Japanese Unexamined Patent Publication No. 2017-48412

SUMMARY

Technical Problem

On the other hand, hot dip galvanized steel sheet used for members for automobiles is required to not only possess press formability, but also not fracture in a brittle manner at the time of deformation upon collision. In particular, in steel sheet used for members for automobiles, not the toughness before press forming, but the toughness after introduction of plastic strain due to press forming has to be excellent. However, in the prior art, the improvement of the toughness after introduction of plastic strain has not necessarily been sufficiently studied. For this reason, there is still room for improvement of the properties of hot dip galvanized steel sheet, in particular hot dip galvanized steel sheet used for members for automobiles.

An object of the present invention is to provide hot dip galvanized steel sheet excellent in press formability and toughness after press forming and a method for producing the same.

Solution to Problem

The inventors engaged in intensive studies for solving this problem and as a result obtained the following findings:

(i) In the continuous hot dip galvanization heat treatment step, martensite is formed by cooling down to the Ms or less after coating or coating and alloying. Further, after that, the steel is reheated and held isothermally to suitably temper the martensite and stabilize the retained austenite. By such heat treatment, the martensite is no longer excessively tempered by the coating or coating and alloying, and therefore the balance of strength and ductility is improved.

(ii) Originally, tempered martensite is a structure excellent in balance of strength and toughness, but if large in size acts as a factor degrading the toughness. The inventors studied means effective for decreasing the number of coarse tempered martensite. As a result, they discovered that it is effective to hold the steel isothermally in a suitable temperature region before dipping in the coating bath and the alloying treatment following that and partially advance bainite transformation. By holding it isothermally, the nontransformed austenite which will later become martensite is split by the bainite. By splitting the austenite by the bainite, it is possible to reduce the size of the martensite formed from such austenite and in relation to this decrease the coarse tempered martensite in the final structure. As a result, the toughness is greatly improved.

(iii) To improve the toughness after introduction of plastic strain, the metallic structure at the time when plastic strain is introduced must not contain a large amount of hard brittle fresh martensite (martensite which is not tempered, i.e., martensite not containing carbides). To reduce such fresh martensite, in the production steps from the hot rolling to the continuous hot dip galvanization, it was found that limiting the producing conditions so that dispersion of Mn between the ferrite and austenite is suppressed, then performing continuous hot dip galvanization heat treatment satisfying the above (i) and (ii) is effective. The details are not necessarily clear, but it is guessed that the source of formation of fresh martensite seen in the metallic structure at the time of introduction of plastic strain is not only the fresh martensite present from before the introduction of plastic strain, but also the unstable retained austenite transforming to martensite by deformation induced transformation due to introduction of slight plastic strain. Such unstable retained austenite is believed to be easily formed at the Mn concentrated part where austempering (stabilization of austenite by dispersion of carbon atoms) is difficult to proceed in a continuous hot dip coating step. The Mn concentrated part may be considered to originally have been a segregated region formed at the time of casting, but if steel further subsequently dwells at the two phase temperature region of ferrite and austenite, an alloy is dispersed between the two phases and the Mn concentrated part becomes more marked. In the two-phase temperature region present in the steps from hot rolling to the continuous hot dip galvanization, by controlling the producing conditions so that not much dispersion of Mn is allowed, the formation of the Mn concentrated part is reduced. Along with this, the amount of unstable retained austenite easily formed at the Mn concentrated part can be made to decrease. As a result, since the amount of martensite resulting from deformation induced transformation is decreased from such unstable retained austenite at the time of introduction of plastic strain, it is guessed that the fresh martensite contained in the metallic structure at the time of introduction of plastic strain is decreased.

The present invention was realized based on the above findings and specifically is as follows:

(1) A hot dip galvanized steel sheet comprising a base steel sheet and a hot dip galvanized layer on at least one surface of the base steel sheet, wherein the base steel sheet has a chemical composition comprising, by mass %, C: 0.100% to 0.350%,
Si: 0.50% to 2.50%,
Mn: 1.00% to 3.50%,
P: 0.050% or less,
S: 0.0100% or less,
Al: 0.001% to 1.500%,
N: 0.0100% or less,
O: 0.0100% or less,
Ti: 0% to 0.200%,
V: 0% to 1.00%,
Nb: 0% to 0.100%,
Cr: 0% to 2.00%,
Ni: 0% to 1.00%,
Cu: 0% to 1.00%,
Co: 0% to 1.00%,
Mo: 0% to 1.00%,
W: 0% to 1.00%,
B: 0% to 0.0100%,
Sn: 0% to 1.00%,
Sb: 0% to 1.00%,
Ca: 0% to 0.0100%,
Mg: 0% to 0.0100%,
Ce: 0% to 0.0100%,
Zr: 0% to 0.0100%,
La: 0% to 0.0100%,
Hf: 0% to 0.0100%,
Bi: 0% to 0.0100%,
REM other than Ce and La: 0% to 0.0100% and
a balance of Fe and impurities,
a steel microstructure at a range of ⅛ thickness to ⅜ thickness centered about a position of ¼ thickness from a surface of the base steel sheet contains, by volume fraction,
ferrite: 0% to 50%,
retained austenite: 6% to 30%,
bainite: 5% or more,
tempered martensite: 5% or more,
fresh martensite: 0% to 10%, and
pearlite and cementite in total: 0% to 5%,
a number density of tempered martensite with a circle equivalent diameter of 5.0 μm or more is 20/1000 μm$^2$ or less, and
an area ratio of fresh martensite with a circle equivalent diameter of 2.0 μm or more after imparting 5% plastic strain is 10% or less.

(2) A method for producing the hot dip galvanized steel sheet according to (1), comprising:

(A) a hot rolling step comprising heating a slab having the chemical composition according to (1) and finish rolling the heated slab by a plurality of rolling stands then coiling it up, wherein the hot rolling step satisfies the conditions of the following (A1) to (A3):

(A1) an average heating rate from Ac1 to Ac1+30° C. at the time of heating the slab is 2 to 50° C./min, (A2) in the finish rolling by the plurality of rolling stands, a rolling reduction per pass is 37% or less, a first pass inlet side temperature is 1000° C. or more, a final pass exit side temperature is 900° C. or more, an average time between stands is 0.20 second or more, and a time from an end of finish rolling to a start of cooling is 1 second or more, and (A3) a coiling temperature is 450 to 680° C., and (B) a hot dip galvanizing step comprising heating the obtained steel sheet to first soak it, first cooling then second soaking the first soaked steel sheet, dipping the second soaked steel sheet in a hot dip galvanizing bath, second cooling the coated steel sheet, and heating the second cooled steel sheet then third soaking it, wherein the hot dip galvanizing step satisfies the conditions of the following (B1) to (B6):

(B1) in the heating of the steel sheet before the first soaking, an average heating rate from Ac1 to Ac1+ 30° C. is 0.5° C./s or more, (B2) the steel sheet is held at a maximum heating temperature of Ac1° C.+30° C. to 950° C. for 1 second to 1000 seconds (first soaking), (B3) an average cooling rate in a temperature range of 700 to 600° C. at the first cooling is 10 to 100° C./s, (B4) the first cooled steel sheet is held in a range of 250 to 480° C. for 80 seconds to 500 seconds (second soaking), (B5) the second cooling is performed down to 150° C. or less, and (B6) the second cooled steel sheet is heated to a temperature region of 300 to 420° C., then held in the temperature region for 100 to 1000 seconds (third soaking).

Advantageous Effects of Invention

According to the present invention, it is possible to obtain high strength hot dip galvanized steel sheet excellent in press formability, specifically high strength hot dip galvanized steel sheet excellent in ductility and hole expandability and further toughness after introduction of plastic strain.

BRIEF DESCRIPTION OF DRAWINGS

FIG. 1 shows a reference view of an SEM secondary electron image.

DESCRIPTION OF EMBODIMENTS

<Hot Dip Galvanized Steel Sheet>

The hot dip galvanized steel sheet according to the embodiment of the present invention comprises a base steel sheet and a hot dip galvanized layer on at least one surface of the base steel sheet, wherein the base steel sheet has a chemical composition comprising, by mass %, C: 0.100% to 0.350%,
Si: 0.50% to 2.50%,
Mn: 1.00% to 3.50%,
P: 0.050% or less,
S: 0.0100% or less,
Al: 0.001% to 1.500%,
N: 0.0100% or less,
O: 0.0100% or less,
Ti: 0% to 0.200%,
V: 0% to 1.00%,
Nb: 0% to 0.100%,
Cr: 0% to 2.00%,
Ni: 0% to 1.00%,
Cu: 0% to 1.00%,
Co: 0% to 1.00%,
Mo: 0% to 1.00%,
W: 0% to 1.00%,
B: 0% to 0.0100%,
Sn: 0% to 1.00%,
Sb: 0% to 1.00%,
Ca: 0% to 0.0100%,
Mg: 0% to 0.0100%,
Ce: 0% to 0.0100%,
Zr: 0% to 0.0100%,
La: 0% to 0.0100%,
Hf: 0% to 0.0100%,
Bi: 0% to 0.0100%,
REM other than Ce and La: 0% to 0.0100% and
a balance of Fe and impurities, a steel microstructure at a range of ⅛ thickness to ⅜ thickness centered about a position of ¼ thickness from a surface of the base steel sheet contains, by volume fraction,
ferrite: 0% to 50%,
retained austenite: 6% to 30%,
bainite: 5% or more,
tempered martensite: 5% or more,
fresh martensite: 0% to 10%, and
pearlite and cementite in total: 0% to 5%, a number density of tempered martensite with a circle equivalent diameter of 5.0 μm or more is 20/1000 μm² or less, and an area ratio of fresh martensite with a circle equivalent diameter of 2.0 μm or more after imparting 5% plastic strain is 10% or less.

[Chemical Composition]

First, the reasons for limitation of the chemical composition of the base steel sheet according to the embodiment of the present invention (below, also simply referred to as the "steel sheet") as described above will be explained. In this Description, the "%" used in prescribing the chemical composition are all "mass %" unless otherwise indicated. Further, in this Description, "to" when showing the ranges of numerical values unless otherwise indicated will be used in the sense including the lower limit values and upper limit values of the numerical values described before and after it.

[C: 0.100% to 0.350%]

C is an element essential for securing the steel sheet strength. If less than 0.100%, the required high strength cannot be obtained, and therefore the content of C is 0.100% or more. The content of C may be 0.120% or more or 0.150% or more as well. On the other hand, if more than 0.350%, the workability or weldability falls, and therefore the content of C is 0.350% or less. The content of C may be 0.340% or less, 0.320% or less, or 0.300% or less as well.

[Si: 0.50% to 2.50%]

Si is an element suppressing formation of iron carbides and contributing to improvement of strength and shapeability, but excessive addition causes the weldability of the steel sheet to deteriorate. Therefore, the content is 0.50 to 2.50%. The content of Si may be 0.60% or more or 0.80% or more as well and/or may be 2.40% or less, 2.20% or less, or 2.00% or less as well.

[Mn: 1.00% to 3.50%]

Mn (manganese) is a powerful austenite stabilizing element and an element effective for increasing the strength of the steel sheet. Excessive addition causes the weldability or low temperature toughness to deteriorate. Therefore, the content is 1.00 to 3.50%. The content of Mn may be 1.20% or more or 1.50% or more as well and/or may be 3.40% or less, 3.20% or less, or 3.00% or less as well.

[P: 0.050% or Less]

P (phosphorus) is a solution strengthening element and an element effective for increasing the strength of the steel sheet, but excessive addition causes the weldability and toughness to deteriorate. Therefore, the content of P is limited to 0.050% or less. Preferably it is 0.045% or less, 0.035% or less, or 0.020% or less. However, since extreme reduction of the content of P would result in high dephosphorizing costs, from the viewpoint of economics, a lower limit of 0.001% is preferable.

[S: 0.0100% or Less]

S (sulfur) is an element contained as an impurity and forms MnS in steel to cause the toughness and hole expandability to deteriorate. Therefore, the content of S is restricted to 0.0100% or less as a range where the toughness and hole expandability do not remarkably deteriorate. Preferably it is 0.0050% or less, 0.0040% or less, or 0.0030% or less. However, since extreme reduction of the content of S would result in high desulfurizing costs, from the viewpoint of economics, a lower limit of 0.001% is preferable.

[Al: 0.001% to 1.500%]

Al (aluminum) is added in at least 0.001% for deoxidation of the steel. However, even if excessively adding it, not only does the effect become saturated and is a rise in cost invited, but also the transformation temperature of the steel is raised and the load at the time of hot rolling is increased. Therefore, an amount of Al of 1.500% is the upper limit. Preferably it is 1.200% or less, 1.000% or less, or 0.800% or less.

[N: 0.0100% or Less]

N (nitrogen) is an element contained as an impurity. If its content is more than 0.0100%, it forms coarse nitrides in the steel and causes deterioration of the bendability and hole expandability. Therefore, the content of N is limited to 0.0100% or less. Preferably it is 0.0080% or less, 0.0060% or less, or 0.0050% or less. However, since extreme reduction of the content of N would result in high denitriding costs, from the viewpoint of economics, a lower limit of 0.0001% is preferable.

[O: 0.0100% or Less]

O (oxygen) is an element contained as an impurity. If its content is more than 0.0100%, it forms coarse oxides in the steel and causes deterioration of the bendability and hole expandability. Therefore, the content of O is limited to 0.0100% or less. Preferably it is 0.0080% or less, 0.0060% or less, or 0.0050% or less. However, from the viewpoint of the producing costs, a lower limit of 0.0001% is preferable.

The basic chemical composition of the base steel sheet according to the embodiment of the present invention is as explained above. The base steel sheet may further contain the following elements according to need.

[Ti: 0% to 0.200%, V: 0% to 1.00%, Nb: 0% to 0.100%, Cr: 0% to 2.00%, Ni: 0% to 1.00%, Cu: 0% to 1.00%, Co: 0% to 1.00%, Mo: 0% to 1.00%, W: 0% to 1.00%, B: 0% to 0.0100%, Sn: 0% to 1.00%, and Sb: 0% to 1.00%]

Ti (titanium), V (vanadium), Nb (niobium), Cr (chromium), Ni (nickel), Cu (copper), Co (cobalt), Mo (molybdenum), W (tungsten), B (boron), Sn (tin), and Sb (antimony) are all elements effective for raising the strength of steel sheet. For this reason, one or more of these elements may be added in accordance with need. However, if excessively adding these elements, the effect becomes saturated and in particular an increase in cost is invited. Therefore, the contents are Ti: 0% to 0.200%, V: 0% to 1.00%, Nb: 0% to 0.100%, Cr: 0% to 2.00%, Ni: 0% to 1.00%, Cu: 0% to 1.00%, Co: 0% to 1.00%, Mo: 0% to 1.00%, W: 0% to 1.00%, B: 0% to 0.0100%, Sn: 0% to 1.00%, Sb: 0% to 1.00%. The elements may also be 0.005% or more or 0.010% or more. In particular, the content of B may be 0.0001% or more or 0.0005% or more.

[Ca: 0% to 0.0100%, Mg: 0% to 0.0100%, Ce: 0% to 0.0100%, Zr: 0% to 0.0100%, La: 0% to 0.0100%, Hf: 0% to 0.0100%, Bi: 0% to 0.0100%, and REM Other than Ce and La: 0% to 0.0100%]

Ca (calcium), Mg (magnesium), Ce (cerium), Zr (zirconium), La (lanthanum), Hf (hafnium), and REM (rare earth elements) other than Ce and La are elements contributing to microdispersion of inclusions in the steel. Bi (bismuth) is an element lightening the microsegregation of Mn, Si, and other substitution type alloying elements in the steel. Since these respectively contribute to improvement of the workability of steel sheet, one or more of these elements may be added in accordance with need. However, excessive addition causes deterioration of the ductility. Therefore, a content of 0.0100% is the upper limit. Further, the elements may be 0.0005% or more or 0.0010% or more as well.

In the base steel sheet according to the embodiment of the present invention, the balance other than the above elements is comprised of Fe and impurities. "Impurities" are constituents entering due to various factors in the producing process, first and foremost the raw materials such as the ore and scrap, when industrially producing the base steel sheet and encompass all constituents not intentionally added to the base steel sheet according to the embodiment of the present invention. Further, "impurities" encompass all elements other than the constituents explained above contained in the base steel sheet in levels where the actions and effects distinctive to those elements do not affect the properties of the hot dip galvanized steel sheet according to the embodiment of the present invention.

[Steel Structures Inside Steel Sheet]

Next, the reasons for limitation of the internal structure of the base steel sheet according to the embodiment of the present invention will be explained.

[Ferrite: 0 to 50%]

Ferrite is a soft structure excellent in ductility. It may be included to improve the elongation of steel sheet in accordance with the demanded strength or ductility. However, if excessively contained, it becomes difficult to secure the desired steel sheet strength. Therefore, the content is a volume fraction of 50% as the upper limit and may be 45% or less, 40% or less, or 35% or less. The content of ferrite may be a volume fraction of 0%. For example, it may be 3% or more, 5% or more, or 10% or more.

[Tempered Martensite: 5% or More]

Tempered martensite is a high strength tough structure and is an essential metallic structure in the present invention. To balance the strength, ductility, and hole expandability at a high level, it is included in a volume fraction of at least 5% or more. Preferably, it is a volume fraction of 10% or more. It may be 15% or more or 20% or more as well. For example, the content of the tempered martensite may be a volume fraction of 85% or less, 80% or less, or 70% or less.

[Fresh Martensite: 0 to 10%]

In the present invention, fresh martensite means martensite which is not tempered, i.e., martensite not containing carbides. This fresh martensite is a brittle structure, so becomes a starting point of fracture at the time of plastic deformation and causes deterioration of the local ductility of the steel sheet. Therefore, the content is a volume fraction of 0 to 10%. More preferably it is 0 to 8% or 0 to 5%. The content of fresh martensite may be a volume fraction of 1% or more or 2% or more.

[Retained Austenite: 6% to 30%]

Retained austenite improves the ductility of steel sheet due to the TRIP effect of transformation into martensite due to work induced transformation during deformation of steel sheet. For this reason, it is contained in a volume fraction of 6% or more. It may be contained in 8% or more or 10% or more as well. The greater the retained austenite, the more the elongation rises, but to obtain a large amount of retained austenite, C and other alloying elements must be included in large amounts. For this reason, the upper limit value of the retained austenite is a volume fraction of 30%. It may be 25% or less or 20% or less as well.

[Pearlite and Cementite in Total: 0 to 5%]

Pearlite includes hard coarse cementite and forms a starting point of fracture at the time of plastic deformation, so causes the local ductility of the steel sheet to deteriorate. Therefore, the content, together with the cementite, is a volume fraction of 0 to 5%. It may also be 0 to 3% or 0 to 2%.

[Bainite: 5% or More]

In the present invention, to suppress the formation of coarse tempered martensite, bainite transformation is partially advanced before the martensite transformation. For this reason, to obtain this effect, the content of bainite has to be a volume fraction of 5% or more. The content of bainite may also be a volume fraction of 8% or more or 12% or more. The upper limit value of the content of bainite is not particularly set, but, for example, may be a volume fraction of 50% or less, 40% or less, or 35% or less.

[Total of Number Density of Tempered Martensite with Circle Equivalent Diameter of 5.0 μm or More of 20/1000 μm$^2$ or less]

To improve the toughness after introduction of plastic strain, the number density of coarse tempered martensite with a circle equivalent diameter of 5.0 μm or more is limited to 20/1000 μm$^2$ or less. Preferably it is 15/1000 μm$^2$ or less or 10/1000 μm$^2$ or less. The number density may also be 0/1000 μm$^2$ or 1/1000 μm$^2$ or more.

[Area Ratio of Fresh Martensite with Circle Equivalent Diameter of 2.0 μm or More after Imparting 5% Plastic Strain: 10% or Less]

For the toughness after introduction of plastic strain, it is important to decrease the fresh martensite present after introduction of plastic strain. In particular, coarse fresh martensite with a circle equivalent diameter of more than 2.0 μm has a large detrimental effect. Therefore, in the steel sheet according to the embodiment of the present invention, the area ratio of fresh martensite with a circle equivalent diameter of 2.0 μm or more after introduction of 5% plastic strain is limited to 10% or less. For example, the area ratio of fresh martensite may be 8% or less or 6% or less as well. Further, the area ratio of fresh martensite may be 0% or may be 1% or more.

The fractions of the steel structures of the hot dip galvanized steel sheet are evaluated by the SEM-EBSD method (electron backscatter diffraction method) and SEM secondary electron image observation.

First, a sample is taken from the cross-section of thickness of the steel sheet parallel to the rolling direction so that the cross-section of thickness at the center position in the width direction becomes the observed surface. The observed surface is machine polished and finished to a mirror surface, then electrolytically polished. Next, in one or more observation fields at a range of ⅛ thickness to ⅜ thickness centered about ¼ thickness from the surface of the base steel sheet at the observed surface, a total area of $2.0 \times 10^{-9}$ m$^2$ or more is analyzed for crystal structures and orientations by the SEM-EBSD method. The data obtained by the EBSD method is analyzed using "OIM Analysis 6.0" made by TSL. Further, the distance between evaluation points (steps) is 0.03 to 0.20 μm. Regions judged to be FCC iron from the results of observation are deemed retained austenite. Further, boundaries with differences in crystal orientation of 15 degrees or more are deemed grain boundaries to obtain a crystal grain boundary map.

Next, the same sample as that observed by EBSD is corroded by Nital and observed by secondary electron image for the same fields as observation by EBSD. Since observing the same fields as the time of EBSD measurement, Vickers indents and other visual marks may be provided in advance. From the obtained secondary electron image, the area ratios of the ferrite, retained austenite, bainite, tempered martensite, fresh martensite, and pearlite are respectively measured and the results deemed the volume fractions. Regions having lower structures in the grains and having several variants of cementite, more specifically two or more variants, precipitating are judged to be tempered martensite (for example, see reference drawing of FIG. 1). Regions where cementite precipitates in lamellar form are judged to be pearlite (or pearlite and cementite in total). Regions which are small in brightness and in which no lower structures are observed are judged to be ferrite (for example, see reference drawing of FIG. 1). Regions which are large in brightness and in which lower structures are not revealed by etching are judged to be fresh martensite and retained austenite (for example, see reference drawing of FIG. 1). Regions not corresponding to any of the above regions are judged to be bainite. The volume ratios of the same are calculated by the point counting method and used as the volume ratios of the structures. The volume ratio of the fresh martensite can be found by subtracting the volume ratio of retained austenite found by X-ray diffraction.

The volume ratio of retained austenite is measured by the X-ray diffraction method. At a range of ⅛ thickness to ⅜ thickness centered about ¼ thickness from the surface of the base steel sheet, a surface parallel to the sheet surface is polished to a mirror finish and measured for area ratio of FCC iron by the X-ray diffraction method. This is used as the volume fraction of the retained austenite.

The number density of tempered martensite with a circle equivalent diameter of 5.0 μm or more is determined by calculating the circle equivalent diameters of tempered martensite in the observed fields by image processing for tempered martensite identified by the above EBSD observation and SEM observation and determining the frequency of presence of tempered martensite with a circle equivalent diameter of 5.0 μm or more.

The area ratio of fresh martensite with a circle equivalent diameter of 2.0 μm or more after introduction of plastic strain is evaluated by the following method. First, a tensile test piece is taken using the width direction of the steel sheet as the long direction of the test piece and prestraining it in advance using a tensile test machine so that the amount of plastic strain becomes 5%. From the center of the parallel part of the prestrained test piece, a sample for observation of the microstructure is taken so that the cross-section of thickness parallel to the rolling direction of the steel sheet becomes the observed surface. The observed surface is machine polished and finished to a mirror surface, then electrolytically polished. After that, the above-mentioned method is used for EBSD observation and SEM observation to identify the fresh martensite, then image processing is used to measure the area ratio of fresh martensite with a circle equivalent diameter of 2.0 μm or more.

(Hot Dip Galvanized Layer)

The base steel sheet according to the embodiment of the present invention has a hot dip galvanized layer on at least one surface, preferably on both surfaces. This coating layer may be a hot dip galvanized layer or hot dip galvannealed layer having any composition known to persons skilled in the art and may include Al and other additive elements in addition to Zn. Further, the amount of deposition of the coating layer is not particularly limited and may be a general amount of deposition.

<Method for Manufacturing Hot Dip Galvanized Steel Sheet>

Next, the method for producing the hot dip galvanized steel sheet according to the embodiment of the present invention will be explained. The following explanation is meant to illustrate the characteristic method for producing the hot dip galvanized steel sheet according to the embodiment of the present invention and is not meant to limit the hot dip galvanized steel sheet to one produced by the production method explained below.

The method for producing the hot dip galvanized steel sheet comprises (A) a hot rolling step comprising heating a slab having the same chemical composition as the chemical composition explained above relating to the base steel sheet and finish rolling the heated slab by a plurality of rolling stands then coiling it up, wherein the hot rolling step satisfies the conditions of the following (A1) to (A3):
(A1) an average heating rate from Ac1 to Ac1+30° C. at the time of heating the slab is 2 to 50° C./min,
(A2) in the finish rolling by the plurality of rolling stands, a rolling reduction per pass is 37% or less, a first pass inlet side temperature is 1000° C. or more, a final pass exit side temperature is 900° C. or more, an average time between stands is 0.20 second or more, and a time from an end of finish rolling to a start of cooling is 1 second or more, and
(A3) a coiling temperature is 450 to 680° C., and (B) a hot dip galvanizing step comprising heating the obtained steel sheet to first soak it, first cooling then second soaking the first soaked steel sheet, dipping the second soaked steel sheet in a hot dip galvanizing bath, second cooling the coated steel sheet, and heating the second cooled steel sheet then third soaking it, wherein the hot dip galvanizing step satisfies the conditions of the following (B1) to (B6):
(B1) in the heating of the steel sheet before the first soaking, an average heating rate from Ac1 to Ac1+30° C. is 0.5° C./s or more,
(B2) the steel sheet is held at a maximum heating temperature of Ac1° C.+30° C. to 950° C. for 1 second to 1000 seconds (first soaking),
(B3) an average cooling rate in a temperature range of 700 to 600° C. at the first cooling is 10 to 100° C./s,
(B4) the first cooled steel sheet is held in a range of 250 to 480° C. for 80 seconds to 500 seconds (second soaking),
(B5) the second cooling is performed down to 150° C. or less, and
(B6) the second cooled steel sheet is heated to a temperature region of 300 to 420° C., then held in the temperature region for 100 to 1000 seconds (third soaking).

Below, the method for producing the hot dip galvanized steel sheet will be explained in detail.

[(A) Hot Rolling Step]

First, in the hot rolling step, a slab having the same chemical composition as the chemical composition explained above relating to the base steel sheet is heated before hot rolling. The heating temperature of the slab is not particularly limited, but for sufficient dissolution of the borides, carbides, etc., generally 1150° C. or more is preferable. The steel slab used is preferably produced by the continuous casting method from the viewpoint of producing ability, but may also be produced by the ingot making method or thin slab casting method.

[Average Heating Rate from Ac1 to Ac1+30° C.: 2 to 50° C./Min]

In this method, the average heating rate from Ac1 to Ac1+30° C. at the time of slab heating is controlled to 2 to 50° C./min. At the two-phase (austenite and ferrite) temperature region right above the Ac1, alloying elements particularly easily become dispersed between the austenite and ferrite. For this reason, when reheating the slab, the slab is heated in this temperature region by a 2° C./min or more relatively fast average speed. If the heating rate falls below 2° C./min, in the final structure after plastic strain, the amount of coarse fresh martensite increases. On the other hand, if performing rapid heating with a heating rate of more than 50° C./min, the temperature distribution in the thickness direction of the slab becomes uneven and thermal stress occurs, so sometimes heat deformation and other inconveniences occur in the slab. For example, the above average heating rate may be 4° C./min or more and/or may be 40° C./min or less, 30° C./min or less, 20° C./min or less, or 10° C./min or less. The Ac1 point is calculated by the following formula: The mass % of the elements are entered for the element symbols in the following formula. For elements not contained, 0 mass % is entered:

$$Ac1(°\text{ C.})=723-10.7\times Mn-16.9\times Ni+29.1\times Si+16.9\times Cr$$

Further, in the present invention, "the average heating rate from Ac1 to Ac1+30° C. at the time of slab heating" means the value obtained by dividing the difference from Ac1 to Ac1+30° C., i.e., 30° C., by the elapsed time from Ac1 until Ac1+30° C.

[Rough Rolling]

In this method, for example, the heated slab may be rough rolled before the finish rolling so as to adjust the sheet thickness etc. Such rough rolling is not particularly limited, it is preferable to perform it to give a total rolling reduction at 1050° C. or more of 60% or more. If the total rolling reduction is less than 60%, since the recrystallization during hot rolling becomes insufficient, sometimes this leads to unevenness of the structure of the hot rolled sheet. The above total rolling reduction may, for example, be 90% or less.

[Finish Rolling by Plurality of Rolling Stands]

The finish rolling is performed in a range satisfying the following conditions: maximum rolling reduction per pass of 37% or less, first pass inlet side temperature of 1000° C. or more, final pass exit side temperature of 900° C. or more, average time between stands of 0.20 second or more, and time from end of the finish rolling to start of cooling of 1 second or more. In the finish rolling, the larger the strain energy accumulated at the austenite, the more easily ferrite transformation occurs at a high temperature after the end of the finish rolling. The lower the ferrite transformation temperature, the more the dispersion of alloying elements, particularly Mn, occurring between the ferrite and austenite can be suppressed. Accordingly, to reduce the strain energy accumulated at the austenite, finish rolling is performed in a range satisfying the above requirements. For example, the maximum rolling reduction per pass may be 30% or less, 25% or less, or 20% or less and/or may be 5% or more. The first pass inlet side temperature may be 1100° C. or less. The final pass exit side temperature may be 1000° C. or less or 990° C. or less. The average time between stands may be 0.50 second or more and/or may be 10 seconds or less. The time from the end of the finish rolling to the start of cooling may be 2 seconds or more or 3 seconds or more and/or may be 10 seconds or less.

[Coiling Temperature: 450 to 680° C.]

The coiling temperature is 450 to 680° C. If the coiling temperature falls below 450° C., the strength of the hot rolled sheet becomes excessive and sometimes the cold rolling ductility is impaired. On the other hand, if the coiling temperature is more than 680° C., the ferrite transformation occurs more easily at a high temperature, so dispersion of alloying elements, in particular Mn, easily occurs between the ferrite and austenite. The coiling temperature may be 500° C. or more and/or may be 650° C. or less or 600° C. or less.

In the present method, the obtained hot rolled steel sheet (hot rolled coil) may be pickled or otherwise treated as required. The hot rolled coil may be pickled by any ordinary method. Further, the hot rolled coil may be skin pass rolled to correct its shape and improve its pickling ability.

[Cold Rolling Step]

In this method, after the hot rolling and/or pickling, the steel sheet may be heat treated as is by a continuous hot dip galvanization line or may be cold rolled, then heat treated on a continuous hot dip galvanization line. If performing cold rolling, the cold rolling reduction is preferably 25% or more or 30% or more. On the other hand, since excessive rolling reduction results in an excessive rolling force and leads to increases in load of the cold rolling mill, the upper limit is preferably 75% or 70%.

[(B) Hot Dip Galvanizing Step]

In this method, after the hot rolling step, the obtained steel sheet is coated in a hot dip galvanizing step. In the hot dip galvanizing step, first, the steel sheet is heated and is subjected to first soaking. While not particularly limited to this, at the time of heating the steel sheet, the average heating rate from 600° C. to Ac1 is preferably limited to for example 10.0° C./s or less. If the average heating rate is more than 10.0° C./s, recrystallization of ferrite does not sufficiently proceed and the steel sheet will sometimes deteriorate in elongation. The average heating rate may also be 6.0° C./s or less. The lower limit value of the average heating rate is not particularly limited, but for example may be 1.0° C./s or more. In the present invention, "the average heating rate from 600° C. to Ac1" means a value obtained by dividing the difference between 600° C. and Ac1 by the elapsed time from 600° C. to Ac1.

[Average Heating Rate from Ac1 to Ac1+30° C.: 0.5° C./s or More]

The average heating rate from Ac1 to Ac1+30° C. at the time of heating the steel sheet is limited to 0.5° C./s or more. If the average heating rate from Ac1 to Ac1+30° C. falls below 0.5° C./s, the dispersion of Mn between the ferrite and austenite becomes remarkable, so in the final structure after plastic strain, the amount of coarse fresh martensite increases. This average heating rate may be 1.0° C./s or more. The upper limit value of the average heating rate is not particularly set, but for example may be 10.0° C./s or less. In the present invention, "the average heating rate from Ac1 to Ac1+30° C. at the time of heating the steel sheet" means a value obtained by dividing the difference from Ac1 to Ac1+30° C., i.e., 30° C., by the elapsed time from Ac1 to Ac1+30° C.

[First Soaking Treatment: Holding at Maximum Heating Temperature of Ac1+30° C. to 950° C. for 1 Second to 1000 Seconds]

To cause sufficient austenite transformation to proceed, the steel sheet is heated to at least Ac1+30° C. or more and held at that temperature (maximum heating temperature) as soaking treatment. However, if excessively raising the heating temperature, not only is deterioration of the toughness due to coarsening of the austenite grain size invited, but also damage to the annealing facilities is led to. For this reason, the upper limit is 950° C., preferably 900° C. If the soaking time is short, austenite transformation does not sufficiently proceed, so the time is at least 1 second or more. Preferably it is 30 seconds or more or 60 seconds or more. On the other hand, if the soaking time is too long, the productivity is damaged, so the upper limit is 1000 seconds, preferably 500 seconds. During soaking, the steel sheet does not necessarily have to be held at a constant temperature. It may also fluctuate within a range satisfying the above conditions. The "holding" in the first soaking treatment and the later explained second soaking treatment and third soaking treatment means maintaining the temperature within a range of a predetermined temperature±20° C., preferably ±10° C., in a range not exceeding the upper limit value and lower limit value prescribed in the soaking treatments. Therefore, for example, a heating or cooling operation which gradually heats or gradually cools whereby the temperature fluctuates by more than 40° C., preferably 20° C., with the temperature ranges prescribed in the soaking treatments are not included in the first, second, and third soaking treatments according to the embodiment of the present invention.

[First Cooling: Average Cooling Rate in Temperature Range of 700 to 600° C.: 10 to 100° C./s]

After holding at the maximum heating temperature, the steel sheet is cooled by the first cooling. The cooling stop temperature is 480° C. to 600° C. which becomes the following second soaking temperature. The average cooling rate in a temperature range of 700° C. to 600° C. is 10 to 100° C./s. If the average cooling rate is less than 10° C./s, sometimes the desired ferrite fraction cannot be obtained. The average cooling rate may be 15° C./s or more or 20° C./s or more. Further, the average cooling rate may also be 80° C./s or less or 60° C./s or less. Further, in the present invention, "the average cooling rate in a temperature range of 700 to 600° C." means the value obtained by dividing the temperature difference between 700° C. and 600° C., i.e., 100° C., by the elapsed time from 700° C. to 600° C.

[Second Soaking Treatment: Holding in Range of 250° C. to 480° C. for 80 to 500 Seconds]

Second soaking treatment is performed by holding the steel sheet in a range of 250° C. to 480° C. for 80 to 500 seconds to partially advance the bainite transformation. Due to the present heat treatment, the nontransformed austenite which later becomes martensite is split by the bainite, so in the final structure, the coarse tempered martensite is reduced and thereby the toughness after introduction of plastic strain can be improved. The temperature of the second soaking treatment may be 280° C. or more and may be 450° C. or less. Further, the holding time may be 100 seconds or more and may be 400 seconds or less. In relation to this, even if simply suitably performing the second soaking treatment, if the dispersion of Mn between the ferrite and austenite is not sufficiently suppressed from the hot rolling step to the hot dip galvanizing step, it will not be possible to reduce the amount of unstable retained austenite which is easily formed at the Mn concentrated part and as a result in the structure after plastic strain, the amount of coarse fresh martensite will increase and the toughness will fall. Therefore, in the method for producing hot dip galvanized steel sheet according to the embodiment of the present invention, to improve the toughness after introduction of plastic strain, it is important to satisfy the conditions of (A1) to (A3) explained above in the hot rolling step while suitably performing the second soaking treatment in the hot dip galvanizing step.

After the second soaking treatment, the steel sheet is dipped in a hot dip galvanization bath. The steel sheet temperature at this time has little effect on the performance of the steel sheet, but if the difference between the steel sheet temperature and the coating bath temperature is too large, since the coating bath temperature will change and sometimes hinder operation, provision of a step for reheating the steel sheet to a range of the coating bath temperature−20° C. to the coating bath temperature+20° C. is desirable. The hot dip galvanization may be performed by an ordinary method. For example, the coating bath temperature may be 440 to 470° C. and the dipping time may be 5 seconds or less. The coating bath is preferably a coating bath containing Al in 0.08 to 0.2%, but as impurities, Fe, Si, Mg, Mn, Cr, Ti, and Pb may also be contained. Further, controlling the basis weight of the coating by gas wiping or another known method is preferable. The basis weight is preferably 25 to 75 g/m² per side.

[Alloying Treatment]

For example, the hot dip galvanized steel sheet formed with the hot dip galvanized layer may be treated to alloy it as required. In this case, if the alloying treatment temperature is less than 460° C., not only does the alloying rate becomes slower and is the productivity hindered, but also uneven alloying treatment occurs, so the alloying treatment temperature is 460° C. or more. On the other hand, if the alloying treatment temperature is more than 600° C., sometimes the alloying excessively proceeds and the coating adhesion of the steel sheet deteriorates. Further, sometimes pearlite transformation proceeds and the desired metallic structure cannot be obtained. Therefore, the alloying treatment temperature is 600° C. or less.

[Second Cooling: Cooling to 150° C. or Less]

The steel sheet after the coating treatment or coating and alloying treatment is cooled by the second cooling which cools it down to the martensite transformation start temperature (Ms) or less so as to make part of the austenite transform to martensite. The martensite produced here is tempered by the subsequent reheating and third soaking treatment to become tempered martensite. If the cooling stop temperature is more than 150° C., the tempered martensite is not sufficiently formed, so the desired metallic structure is not obtained. Therefore, the cooling stop temperature is 150° C. or less. It may also be 100° C. or less. The Ms point is calculated by the following formula: The mass % of the elements are entered for the element symbols in the following formula. For elements not contained, 0 mass % is entered:

$$Ms(°C.)=550-361\times C-39\times Mn-35\times V-20\times Cr-17\times Ni-10\times Cu-5\times Mo+30\times Al$$

[Third Soaking Treatment: Holding in Range of 300° C. to 420° C. for 100 to 1000 Seconds]

After the second cooling, the steel sheet is reheated to a range of 300° C. to 420° C. for the third soaking treatment. In this step, to obtain the desired amount of retained austenite, carbon is made to concentrate in the austenite to stabilize the austenite (austemper it). In addition, the martensite produced at the time of the second cooling is tempered. If the holding temperature is less than 300° C. or the holding time is less than 100 seconds, since the bainite transformation does not sufficiently proceed, it becomes difficult to obtain the desired amount of retained austenite or the nontransformed austenite which later becomes martensite is not sufficiently split by the bainite and as a result sometimes a large amount of coarse fresh martensite is produced after introduction of plastic strain. On the other hand, if the holding temperature is more than 420° C. or if the holding time is more than 1000 seconds, since the martensite is excessively tempered and bainite transformation excessively proceeds, it becomes difficult to obtain the desired strength and metallic structure. The temperature of the third soaking treatment may be 350° C. or more and may be 400° C. or less. Further, the holding time may be 150 seconds or more and may be 600 seconds or less.

After the third soaking treatment, the steel sheet is cooled down to room temperature to obtain the final finished product. The steel sheet may also be skin pass rolled to correct the flatness and adjust the surface roughness. In this case, to avoid deterioration of the ductility, the elongation rate is preferably 2% or less.

EXAMPLES

Next, examples of the present invention will be explained. The conditions in the examples are illustrations of conditions employed for confirming the workability and effects of the present invention. The present invention is not limited to these illustrations of conditions. The present invention can employ various conditions so long as not deviating from the gist of the present invention and achieving the object of the present invention.

Example A

Steels having the chemical compositions shown in Table 1 were cast to prepare slabs. The balance other than the constituents shown in Table 1 comprised Fe and impurities. These slabs were hot rolled under the conditions shown in Table 2 to produce hot rolled steel sheets. After that, the hot rolled steel sheets were pickled to remove the surface scale. After that, they were cold rolled. Further, the obtained steel sheets were continuously hot dip galvanized under the conditions shown in Table 2 and suitably treated for alloying. In the soaking treatments shown in Table 2, the temperatures were held within a range of the temperatures shown in Table 2±10° C. The chemical compositions of the base steel sheets obtained by analyzing samples taken from the produced hot dip galvanized steel sheets were equal with the chemical compositions of the steels shown in Table 1.

TABLE 1-1

| Steel type | C | Si | Mn | P | S | Al | N | O | Cr | Mo | V | Nb |
|---|---|---|---|---|---|---|---|---|---|---|---|---|
| A | 0.163 | 1.02 | 2.66 | 0.011 | 0.0023 | 0.100 | 0.0037 | 0.0005 | | | 0.28 | |
| B | 0.230 | 1.88 | 1.28 | 0.009 | 0.0020 | 0.015 | 0.0024 | 0.0017 | 1.08 | | | |
| C | 0.116 | 0.63 | 3.32 | 0.023 | 0.0030 | 0.030 | 0.0024 | 0.0011 | | | | |
| D | 0.212 | 1.49 | 2.17 | 0.012 | 0.0015 | 0.024 | 0.0031 | 0.0025 | | | | 0.012 |

TABLE 1-1-continued

| Steel type | C | Si | Mn | P | S | Al | N | O | Cr | Mo | V | Nb |
|---|---|---|---|---|---|---|---|---|---|---|---|---|
| E | 0.298 | 1.66 | 1.51 | 0.016 | 0.0024 | 0.023 | 0.0013 | 0.0018 | | | | |
| F | 0.157 | 2.02 | 1.68 | 0.025 | 0.0020 | 0.076 | 0.0014 | 0.0028 | | | | |
| G | 0.185 | 0.97 | 2.20 | 0.007 | 0.0025 | 0.652 | 0.0049 | 0.0017 | | | 0.23 | |
| H | 0.132 | 0.81 | 2.94 | 0.031 | 0.0005 | 1.120 | 0.0053 | 0.0010 | | | | |
| I | 0.206 | 1.60 | 2.27 | 0.010 | 0.0015 | 0.018 | 0.0014 | 0.0017 | | | | |
| J | 0.339 | 0.95 | 1.09 | 0.045 | 0.0007 | 0.151 | 0.0043 | 0.0007 | 0.21 | 0.40 | | |
| K | 0.135 | 2.40 | 1.39 | 0.004 | 0.0024 | 0.008 | 0.0050 | 0.0022 | | 0.08 | | |
| L | 0.193 | 1.22 | 2.41 | 0.027 | 0.0017 | 0.056 | 0.0057 | 0.0012 | | | | |
| M | 0.205 | 1.29 | 2.73 | 0.009 | 0.0029 | 0.417 | 0.0040 | 0.0011 | | | | |
| N | 0.177 | 1.90 | 2.46 | 0.013 | 0.0020 | 0.037 | 0.0013 | 0.0015 | | | 0.13 | |
| O | 0.224 | 0.95 | 2.52 | 0.006 | 0.0011 | 0.592 | 0.0035 | 0.0005 | | | 0.22 | |
| P | 0.094 | 1.51 | 2.50 | 0.009 | 0.0026 | 0.042 | 0.0050 | 0.0007 | | | | |
| Q | 0.197 | 0.30 | 2.53 | 0.015 | 0.0026 | 0.014 | 0.0035 | 0.0020 | | | | |
| R | 0.180 | 1.41 | 0.92 | 0.018 | 0.0030 | 0.103 | 0.0034 | 0.0020 | | | | |
| S | 0.192 | 1.08 | 3.80 | 0.008 | 0.0027 | 0.032 | 0.0051 | 0.0026 | | | | |
| T | 0.370 | 1.71 | 1.77 | 0.014 | 0.0012 | 0.044 | 0.0015 | 0.0021 | | | | |
| U | 0.167 | 2.77 | 2.08 | 0.010 | 0.0021 | 0.005 | 0.0060 | 0.0028 | | | | |
| V | 0.194 | 1.01 | 2.60 | 0.013 | 0.0018 | 1.710 | 0.0015 | 0.0008 | | | | |

Bold underlines indicate outside scope of present invention.
Empty field in table indicates corresponding chemical constituent not intentionally added.

TABLE 1-2

| Steel type | Ti | B | Cu | Ni | Co | W | Sn | Sb | Others | Ac1 | Ms |
|---|---|---|---|---|---|---|---|---|---|---|---|
| A | | | | | | | | | | 724 | 381 |
| B | | | | | | | | | | 782 | 396 |
| C | | | 0.27 | 0.25 | | | | | | 702 | 373 |
| D | | | | | | | | | | 743 | 390 |
| E | 0.025 | 0.0018 | | | | | | | | 755 | 384 |
| F | | | | | 0.41 | 0.18 | | | | 764 | 430 |
| G | | | | | | | | | REM: 0.0036 | 728 | 416 |
| H | | | | | | | | | | 715 | 421 |
| I | | | | | | | 0.14 | 0.11 | | 745 | 388 |
| J | | | | | | | | | Ca: 0.0029 | 743 | 383 |
| K | | | | 0.59 | | | | | Ce: 0.0050, Zr: 0.0064 | 768 | 437 |
| L | | | | | | | | | Hf: 0.0042 | 733 | 388 |
| M | 0.056 | 0.0021 | | | | | | | Bi: 0.0068 | 731 | 882 |
| N | 0.019 | 0.0020 | | | | | | | Mg: 0.0051 | 752 | 391 |
| O | 0.020 | 0.0035 | | | | | | | | 724 | 888 |
| P | | | | | | | | | | 740 | 420 |
| Q | | | | | | | | | | 705 | 381 |
| R | | | | | | | | | | 754 | 452 |
| S | | | | | | | | | | 714 | 333 |
| T | | | | | | | | | | 754 | 349 |
| U | | | | | | | | | | 781 | 409 |
| V | | | | | | | | | | 725 | 430 |

Bold underlines indicate outside scope of present invention.
Empty field in table indicates corresponding chemical constituent not intentionally added.

TABLE 2-1

| | | Hot rolling step | | | | | | | | Cold rolling step |
|---|---|---|---|---|---|---|---|---|---|---|
| No. | Steel type | Slab heating temp. ° C. | Slab heating rate (Ac1~Ac1 + 30° C.) ° C./min | Total rolling reduction of rough rolling at 1050° C. or more % | Finish inlet side temp. ° C. | Finish exit side temp. ° C. | Max. rolling reduction % | Average time between stands s | Time from end of finish rolling to start of cooling s | Coiling temp. ° C. | Cold rolling reduction % |
| 1 | A | 1220 | 6 | 88 | 1070 | 960 | 20 | 0.5 | 3 | 600 | 56 |
| 2 | A | 1270 | 8 | 88 | 1010 | 920 | 20 | 0.5 | 3 | 600 | 56 |
| 3 | A | 1210 | 5 | 88 | 1090 | 980 | 20 | 0.5 | 3 | 540 | 56 |
| 4 | A | 1240 | 0.4 | 88 | 1040 | 930 | 20 | 0.5 | 3 | 550 | 56 |
| 5 | A | 1220 | 6 | 88 | 1070 | 960 | 20 | 0.5 | 3 | 600 | 56 |
| 6 | B | 1260 | 7 | 88 | 1010 | 900 | 20 | 0.5 | 3 | 500 | 56 |
| 7 | B | 1240 | 5 | 88 | 1030 | 940 | 20 | 0.5 | 3 | 500 | 56 |
| 8 | B | 1250 | 7 | 88 | 950 | 850 | 20 | 0.5 | 3 | 590 | 56 |
| 9 | B | 1260 | 7 | 88 | 1010 | 900 | 20 | 0.5 | 3 | 500 | 56 |
| 10 | C | 1210 | 9 | 88 | 1020 | 900 | 20 | 0.5 | 3 | 570 | 56 |
| 11 | C | 1230 | 9 | 88 | 1040 | 920 | 20 | 0.5 | 3 | 530 | 56 |
| 12 | C | 1240 | 6 | 88 | 1050 | 940 | 20 | 0.5 | 3 | 500 | 56 |
| 13 | C | 1210 | 9 | 88 | 1020 | 900 | 20 | 0.5 | 3 | 570 | 56 |

TABLE 2-1-continued

| | | | Hot rolling step | | | | | | | | Cold rolling step |
|---|---|---|---|---|---|---|---|---|---|---|---|
| No. | Steel type | Slab heating temp. °C. | Slab heating rate (Ac1~Ac1 + 30° C.) °C./min | Total rolling reduction of rough rolling at 1050° C. or more % | Finish inlet side temp. °C. | Finish exit side temp. °C. | Max. rolling reduction % | Average time between stands s | Time from end of finish rolling to start of cooling s | Coiling temp. °C. | Cold rolling reduction % |
| 14 | D | 1210 | 6 | 88 | 1020 | 900 | 20 | 0.5 | 3 | 540 | 56 |
| 15 | D | 1260 | 7 | 88 | 1040 | 940 | 20 | 0.5 | 3 | 480 | 56 |
| 16 | D | 1230 | 5 | 88 | 1030 | 930 | 20 | 0.5 | 3 | 580 | 56 |
| 17 | D | 1270 | 5 | 88 | 1060 | 940 | 20 | 0.5 | 3 | 530 | 56 |
| 18 | D | 1270 | 5 | 88 | 1060 | 940 | 20 | 0.5 | 3 | 530 | 56 |
| 19 | D | 1210 | 6 | 88 | 1020 | 900 | 20 | 0.5 | 3 | 540 | 56 |
| 20 | E | 1220 | 4 | 88 | 1070 | 970 | 20 | 0.5 | 3 | 510 | 56 |
| 21 | E | 1280 | 6 | 88 | 1060 | 970 | 20 | 0.5 | 3 | 500 | 56 |
| 22 | E | 1260 | 5 | 88 | 1020 | 920 | 38 | 0.07 | 3 | 600 | 56 |
| 23 | E | 1220 | 4 | 88 | 1070 | 970 | 20 | 0.5 | 3 | 510 | 56 |
| 24 | F | 1220 | 8 | 88 | 1060 | 960 | 20 | 0.5 | 3 | 500 | 56 |
| 25 | F | 1230 | 7 | 88 | 1050 | 950 | 20 | 0.5 | 3 | 590 | 56 |
| 26 | F | 1240 | 7 | 88 | 1070 | 940 | 20 | 0.5 | 3 | 580 | 56 |
| 27 | F | 1220 | 8 | 88 | 1040 | 940 | 20 | 0.5 | 0.3 | 560 | 56 |

Bold underlines indicate outside scope of present invention.

TABLE 2-2

| | | | Hot rolling step | | | | | | | | Cold rolling step |
|---|---|---|---|---|---|---|---|---|---|---|---|
| No. | Steel type | Slab heating temp. °C. | Slab heating rate (Ac1~Ac1 + 30° C.) °C./min | Total rolling reduction of rough rolling at 1050° C. or more % | Finish inlet side temp. °C. | Finish exit side temp. °C. | Max. rolling reduction % | Average time between stands s | Time from end of finish rolling to start of cooling s | Coiling temp. °C. | Cold rolling reduction % |
| 28 | G | 1280 | 8 | 88 | 1050 | 930 | 20 | 0.5 | 3 | 580 | 56 |
| 29 | G | 1250 | 5 | 88 | 1030 | 920 | 20 | 0.5 | 3 | 550 | 30 |
| 30 | G | 1230 | 2 | 65 | 1070 | 940 | 29 | 0.5 | 3 | 650 | 67 |
| 31 | G | 1260 | 9 | 88 | 1060 | 950 | 20 | 0.5 | 3 | 770 | 56 |
| 32 | H | 1280 | 8 | 88 | 1080 | 990 | 20 | 0.5 | 3 | 570 | 56 |
| 33 | I | 1250 | 5 | 88 | 1030 | 940 | 20 | 0.5 | 3 | 560 | 56 |
| 34 | J | 1210 | 4 | 88 | 1080 | 970 | 20 | 0.5 | 3 | 510 | 56 |
| 35 | K | 1210 | 4 | 88 | 1080 | 980 | 20 | 0.5 | 3 | 550 | 56 |
| 36 | L | 1220 | 4 | 88 | 1030 | 920 | 20 | 0.5 | 3 | 530 | 56 |
| 37 | M | 1250 | 7 | 88 | 1010 | 910 | 20 | 0.5 | 3 | 520 | 56 |
| 38 | M | 1230 | 6 | 88 | 1010 | 940 | 20 | 0.5 | 3 | 560 | 56 |
| 39 | M | 1250 | 7 | 88 | 1010 | 910 | 20 | 0.5 | 3 | 520 | 56 |
| 40 | N | 1240 | 4 | 88 | 1040 | 940 | 20 | 0.5 | 3 | 580 | 56 |
| 41 | N | 1250 | 6 | 88 | 1030 | 950 | 20 | 0.5 | 3 | 550 | 56 |
| 42 | N | 1250 | 4 | 88 | 1040 | 950 | 20 | 0.5 | 3 | 560 | 56 |
| 43 | O | 1270 | 5 | 88 | 1060 | 950 | 20 | 0.5 | 3 | 540 | 56 |
| 44 | P | 1220 | 9 | 88 | 1040 | 920 | 20 | 0.5 | 3 | 580 | 56 |
| 45 | Q | 1250 | 8 | 88 | 1030 | 920 | 20 | 0.5 | 3 | 510 | 56 |
| 46 | R | 1250 | 8 | 88 | 1070 | 950 | 20 | 0.5 | 3 | 590 | 56 |
| 47 | S | 1220 | 5 | 88 | 1040 | 920 | 20 | 0.5 | 3 | 520 | 56 |
| 48 | T | 1220 | 5 | 88 | 1060 | 940 | 20 | 0.5 | 3 | 490 | 56 |
| 49 | U | 1260 | 4 | 88 | 1090 | 1000 | 20 | 0.5 | 3 | 570 | 56 |
| 50 | V | 1280 | 6 | 88 | 1060 | 940 | 20 | 0.5 | 3 | 510 | 56 |
| 51 | D | 1240 | 7 | 88 | 1050 | 970 | 20 | 0.5 | 3 | 560 | 56 |
| 52 | D | 1220 | 7 | 88 | 1040 | 910 | 20 | 0.5 | 3 | 550 | 56 |
| 53 | D | 1240 | 5 | 88 | 1030 | 900 | 35 | 0.3 | 1 | 590 | 56 |
| 54 | E | 1230 | 6 | 88 | 1070 | 960 | 25 | 0.5 | 3 | 560 | 56 |

Bold underlines indicate outside scope of present invention.

TABLE 2-3

| | Hot dip galvanizing step | | | | | | | | | | |
|---|---|---|---|---|---|---|---|---|---|---|---|
| | Heating | | First soaking | | First cooling | Second soaking | | Alloying | Second cooling Cooling stop. | Third soaking | |
| No. | Heating rate between 600° C.-Ac1 ° C./s | Heating rate between Ac1-Ac1 + 30° C. ° C./s | Temp. ° C. | Holding time s | Average cooling rate between 700-600° C. ° C./s | Temp. ° C. | Holding time s | Alloying temp. ° C. | stop. temp. ° C. | Temp. ° C. | Holding time s |
| 1 | 4.6 | 1.4 | 815 | 90 | 27 | 320 | 105 | 485 | 60 | 390 | 180 |
| 2 | 5.1 | 1.8 | 815 | 90 | 27 | 320 | 105 | 495 | 190 | 390 | 180 |
| 3 | 5.3 | 1.7 | 815 | 90 | 27 | 20 | 105 | 495 | 50 | 400 | 1500 |
| 4 | 4.9 | 1.7 | 810 | 90 | 28 | 320 | 105 | 480 | 60 | 400 | 180 |
| 5 | 4.6 | 1.5 | 815 | 90 | 27 | 300 | 105 | — | 60 | 380 | 180 |
| 6 | 5.2 | 1.6 | 340 | 90 | 33 | 300 | 105 | 500 | 70 | 400 | 180 |
| 7 | 5.3 | 1.7 | 740 | 90 | 25 | 300 | 105 | 480 | 60 | 400 | 180 |
| 8 | 5.0 | 1.8 | 820 | 90 | 26 | 300 | 105 | 490 | 70 | 390 | 180 |
| 9 | 5.2 | 1.6 | 340 | 90 | 33 | 300 | 105 | — | 70 | 400 | 180 |
| 10 | 4.5 | 1.6 | 805 | 90 | 22 | 330 | 105 | 505 | 60 | 410 | 370 |
| 11 | 5.0 | 1.6 | 305 | 90 | 28 | 310 | 105 | 505 | 50 | 250 | 180 |
| 12 | 4.5 | 1.3 | 800 | 90 | 2 | 310 | 105 | 495 | 60 | 400 | 180 |
| 13 | 4.5 | 1.6 | 800 | 90 | 22 | 330 | 105 | — | 50 | 400 | 370 |
| 14 | 5.3 | 1.5 | 820 | 90 | 36 | 310 | 105 | 485 | 60 | 410 | 180 |
| 15 | 4.8 | 1.8 | 820 | 90 | 29 | 310 | 105 | 475 | 60 | 400 | 75 |
| 16 | 4.6 | 1.8 | 820 | 90 | 29 | 310 | 105 | 495 | 60 | 450 | 180 |
| 17 | 4.9 | 1.6 | 820 | 90 | 29 | 340 | 900 | 495 | 50 | 390 | 180 |
| 18 | 4.8 | 1.7 | 840 | 90 | 40 | 520 | 105 | 500 | 50 | 400 | 180 |
| 19 | 5.3 | 1.5 | 320 | 90 | 31 | 310 | 105 | — | 60 | 400 | 180 |
| 20 | 5.2 | 1.5 | 830 | 90 | 29 | 350 | 105 | 480 | 90 | 390 | 180 |
| 21 | 5.3 | 1.8 | 330 | 90 | 29 | 330 | 50 | 495 | 60 | 400 | 180 |
| 22 | 4.5 | 1.2 | 830 | 90 | 30 | 330 | 105 | 480 | 40 | 380 | 180 |
| 23 | 5.2 | 1.5 | 820 | 90 | 29 | 850 | 105 | — | 90 | 390 | 180 |
| 24 | 4.6 | 1.5 | 360 | 90 | 38 | 310 | 105 | 475 | 50 | 390 | 180 |
| 25 | 4.7 | 1.6 | 860 | 90 | 35 | 450 | 105 | 480 | 60 | 380 | 180 |
| 26 | 4.9 | 1.7 | 850 | 90 | 33 | 390 | 105 | 485 | 90 | 300 | 180 |
| 27 | 4.8 | 1.6 | 860 | 90 | 35 | 370 | 105 | 470 | 50 | 390 | 180 |

Bold underlines indicate outside scope of present invention.

TABLE 2-4

| | Hot dip galvanizing step | | | | | | | | | | |
|---|---|---|---|---|---|---|---|---|---|---|---|
| | Heating | | First soaking | | First cooling | Second soaking | | Alloying | Second cooling Cooling stop. | Third soaking | |
| No. | Heating rate between 600° C.-Ac1 ° C./s | Heating rate between Ac1-Ac1 + 30° C. ° C./s | Temp. ° C. | Holding time s | Average cooling rate between 700-600° C. ° C./s | Temp. ° C. | Holding time s | Alloying temp. ° C. | stop. temp. ° C. | Temp. ° C. | Holding time s |
| 28 | 5.2 | 1.4 | 890 | 90 | 38 | 290 | 105 | 490 | 50 | 370 | 180 |
| 29 | 5.0 | 1.6 | 890 | 90 | 27 | 410 | 105 | 550 | 70 | 370 | 105 |
| 30 | 4.2 | 1.6 | 880 | 90 | 30 | 320 | 105 | 500 | 30 | 380 | 180 |
| 31 | 4.6 | 2.0 | 880 | 90 | 36 | 360 | 105 | 490 | 80 | 380 | 180 |
| 32 | 5.3 | 1.7 | 900 | 90 | 40 | 300 | 105 | 480 | 90 | 410 | 180 |
| 33 | 5.0 | 1.7 | 830 | 90 | 30 | 260 | 105 | 485 | 80 | 380 | 180 |
| 34 | 4.8 | 1.4 | 820 | 90 | 29 | 290 | 105 | 500 | 90 | 390 | 180 |
| 35 | 1.9 | 0.6 | 880 | 270 | 13 | 300 | 315 | 480 | 50 | 360 | 540 |
| 36 | 5.0 | 1.7 | 860 | 90 | 36 | 310 | 105 | 495 | 40 | 400 | 180 |
| 37 | 4.9 | 1.7 | 865 | 90 | 52 | 360 | 105 | 530 | 90 | 100 | 180 |
| 38 | 5.5 | 2.2 | 900 | 90 | 60 | 370 | 105 | 530 | 100 | 400 | 180 |
| 39 | 4.9 | 1.7 | 865 | 90 | 52 | 360 | 105 | — | 80 | 380 | 180 |
| 40 | 4.6 | 1.3 | 865 | 90 | 52 | 350 | 105 | 530 | 70 | 380 | 180 |
| 41 | 4.6 | 1.3 | 860 | 90 | 52 | 400 | 105 | 540 | 80 | 300 | 180 |
| 42 | 4.8 | 1.4 | 870 | 90 | 33 | 380 | 105 | — | 80 | 370 | 180 |
| 43 | 5.8 | 2.1 | 870 | 90 | 41 | 370 | 105 | — | 80 | 380 | 370 |
| 44 | 4.9 | 1.7 | 850 | 90 | 46 | 300 | 105 | 480 | 60 | 400 | 180 |
| 45 | 4.5 | 1.5 | 815 | 90 | 39 | 340 | 105 | 490 | 60 | 380 | 180 |
| 46 | 4.5 | 1.5 | 900 | 90 | 37 | 350 | 105 | 470 | 80 | 380 | 180 |
| 47 | 5.2 | 1.5 | 810 | 90 | 46 | 340 | 105 | 490 | 50 | 390 | 180 |
| 48 | 4.7 | 1.4 | 840 | 90 | 42 | 340 | 105 | 495 | 70 | 410 | 180 |
| 49 | 4.8 | 1.7 | 900 | 90 | 44 | 300 | 105 | 475 | 70 | 400 | 180 |
| 50 | 5.2 | 1.6 | 900 | 90 | 44 | 320 | 105 | 500 | 50 | 400 | 180 |
| 51 | 4.2 | 0.2 | 830 | 90 | 35 | 350 | 105 | 490 | 80 | 400 | 180 |

TABLE 2-4-continued

| | Heating | | First soaking | | First cooling | Second soaking | | Alloying | Second cooling stop. temp. ° C. | Third soaking | |
|---|---|---|---|---|---|---|---|---|---|---|---|
| | Heating rate between 600° C.-Ac1 | Heating rate between Ac1-Ac1 + 30° C. | | Holding | Average cooling rate between 700-600° C. | | Holding | Alloying | | | Holding |
| No. | ° C./s | ° C./s | Temp. ° C. | time s | ° C./s | Temp. ° C. | time s | temp. ° C. | | Temp. ° C. | time s |
| 52 | 4.7 | 1.5 | 820 | 90 | 38 | 380 | 105 | 480 | 50 | — | — |
| 53 | 6.0 | 1.7 | 830 | 90 | 37 | 330 | 105 | 470 | 30 | 400 | 180 |
| 54 | 5.1 | 1.9 | 830 | 90 | 32 | — | — | 480 | 50 | 400 | 180 |

Bold underlines indicate outside scope of present invention.

A JIS No. 5 tensile test piece was taken from each of the thus obtained steel sheets in a direction perpendicular to the rolling direction and was subjected to a tensile test based on JIS Z2241: 2011 to measure the tensile strength (TS) and total elongation (El). Further, each test piece was tested by the "JFS T 1001 Hole Expansion Test Method" of the Japan Iron and Steel Federation Standards to measure the hole expansion rate (λ). A test piece with a TS of 980 MPa or more and a TS×El×λ$^{0.5}$/1000 of 80 or more was judged good in mechanical properties and as having press formability preferable for use as a member for automobiles.

The toughness after the introduction of plastic strain (toughness after press forming) was evaluated by the following technique. A JIS No. 5 tensile test piece was taken in a direction perpendicular to the rolling direction and given 5% plastic strain by a tensile test. A 2 mm V-notched Charpy test piece was taken from a parallel part of the tensile test piece after imparting strain. After that, a strained material and nonstrained material were subjected to a Charpy test at the test temperature and −20° C. A test piece with a ratio of Charpy absorption energy after imparting strain/Charpy absorption energy before imparting plastic strain of 0.7 or more was judged as "very good", one of 0.5 to 0.7 was judged as "good", and one of 0.5 or less was judged as "poor". Ones evaluated as very good and good were considered as passing.

The results are shown in Table 3. In Table 3, "GA" means hot dip galvannealing, while GI means hot dip galvanizing without alloying treatment.

TABLE 3-1

| | | | Microstructure | | | | | |
|---|---|---|---|---|---|---|---|---|
| No. | Steel type | Coating | Ferrite % | Retained austenite % | Tempered martensite % | Fresh martensite % | Pearlite + cementite % | Bainite % |
| 1 | A | GA | 25 | 9 | 27 | 3 | 0 | 36 |
| 2 | A | GA | 25 | 11 | 6 | 8 | 0 | 50 |
| 3 | A | GA | 25 | 4 | 27 | 0 | 0 | 44 |
| 4 | A | GA | 28 | 12 | 20 | 8 | 0 | 32 |
| 5 | A | GI | 25 | 10 | 24 | 2 | 0 | 39 |
| 6 | B | GA | 34 | 16 | 36 | 2 | 0 | 12 |
| 7 | B | GA | 77 | 2 | 0 | 5 | 6 | 10 |
| 8 | B | GA | 40 | 14 | 22 | 7 | 0 | 17 |
| 9 | B | GI | 4 | 16 | 32 | 2 | 0 | 46 |
| 10 | C | GA | 9 | 6 | 71 | 6 | 0 | 8 |
| 11 | C | GA | 9 | 3 | 70 | 11 | 0 | 7 |
| 12 | C | GA | 65 | 5 | 12 | 5 | 6 | 7 |
| 13 | C | GI | 9 | 7 | 68 | 3 | 0 | 13 |
| 14 | D | GA | 32 | 14 | 22 | 2 | 0 | 30 |
| 15 | D | GA | 35 | 12 | 24 | 9 | 0 | 20 |
| 16 | D | GA | 35 | 9 | 24 | 13 | 0 | 19 |
| 17 | D | GA | 35 | 11 | 2 | 5 | 0 | 47 |
| 18 | D | GA | 20 | 11 | 60 | 1 | 0 | 8 |
| 19 | D | GI | 37 | 13 | 20 | 1 | 0 | 29 |
| 20 | E | GA | 19 | 22 | 37 | 4 | 0 | 18 |
| 21 | E | GA | 19 | 16 | 60 | 2 | 0 | 3 |
| 22 | E | GA | 32 | 22 | 21 | 9 | 0 | 16 |
| 23 | E | GI | 19 | 22 | 33 | 4 | 0 | 22 |
| 24 | F | GA | 33 | 13 | 25 | 3 | 0 | 26 |
| 25 | F | GA | 33 | 11 | 43 | 2 | 0 | 11 |
| 26 | F | GA | 38 | 10 | 18 | 9 | 0 | 25 |
| 27 | F | GA | 44 | 13 | 29 | 4 | 0 | 10 |

TABLE 3-1-continued

| | Microstructure | | Mechanical properties | | | | | |
|---|---|---|---|---|---|---|---|---|
| | Fresh martensite after prestrain | Tempered martensite | Press formability | | | | Toughness | |
| No. | (≥2 μm) % | (≥5 μm)/ 1000 μm² | TS MPa | El % | λ % | TS*El*λ^0.5/ 1000 | after prestrain | Remarks |
| 1 | 5 | 2 | 1023 | 19.7 | 33 | 116 | Very good | Ex. |
| 2 | 12 | 0 | 1050 | 16.8 | 19 | 77 | Poor | Comp. ex. |
| 3 | 0 | 2 | 988 | 14.0 | 32 | 78 | Very good | Comp. ex. |
| 4 | 11 | 5 | 1058 | 19.0 | 20 | 90 | Poor | Comp. ex. |
| 5 | 4 | 3 | 1007 | 20.0 | 35 | 119 | Very good | Ex. |
| 6 | 4 | 3 | 1087 | 22.5 | 26 | 125 | Very good | Ex. |
| 7 | 0 | 0 | 689 | 29.7 | 20 | 92 | Good | Comp. ex. |
| 8 | 13 | 5 | 1029 | 22.0 | 21 | 104 | Poor | Comp. ex. |
| 9 | 5 | 3 | 1078 | 22.1 | 25 | 119 | Very good | Ex. |
| 10 | 8 | 11 | 1036 | 17.0 | 21 | 81 | Good | Ex. |
| 11 | 11 | 11 | 1289 | 11.8 | 20 | 68 | Poor | Comp. ex. |
| 12 | 8 | 1 | 854 | 19.9 | 20 | 76 | Good | Comp. ex. |
| 13 | 6 | 10 | 1022 | 17.0 | 24 | 85 | Good | Ex. |
| 14 | 4 | 2 | 1008 | 24.3 | 35 | 145 | Very good | Ex. |
| 15 | 12 | 3 | 1026 | 22.6 | 17 | 96 | Poor | Comp. ex. |
| 16 | 15 | 3 | 1033 | 20.8 | 15 | 83 | Poor | Comp. ex. |
| 17 | 8 | 0 | 900 | 21.1 | 17 | 78 | Very good | Comp. ex. |
| 18 | 2 | 21 | 1119 | 17.7 | 45 | 133 | Poor | Comp. ex. |
| 19 | 4 | 2 | 997 | 24.8 | 31 | 138 | Very good | Ex. |
| 20 | 8 | 12 | 1140 | 25.4 | 22 | 136 | Very good | Ex. |
| 21 | 9 | 21 | 1174 | 21.2 | 23 | 119 | Poor | Comp. ex. |
| 22 | 14 | 5 | 1138 | 19.8 | 16 | 90 | Poor | Comp. ex. |
| 23 | 7 | 11 | 1129 | 26.0 | 21 | 135 | Very good | Ex. |
| 24 | 4 | 4 | 982 | 23.1 | 38 | 140 | Very good | Ex. |
| 25 | 6 | 10 | 1068 | 21.0 | 34 | 131 | Very good | Ex. |
| 26 | 10 | 3 | 1110 | 17.3 | 25 | 96 | Good | Ex. |
| 27 | 12 | 5 | 999 | 22.5 | 26 | 115 | Poor | Comp. ex. |

Bold underlines indicate outside scope of present invention.

TABLE 3-2

| | | | Microstructure | | | | | |
|---|---|---|---|---|---|---|---|---|
| No. | Steel type | Coating | Ferrite % | Retained austenite % | Tempered martensite % | Fresh martensite % | Pearlite + cementite % | Bainite % |
| 28 | G | GA | 30 | 13 | 33 | 2 | 0 | 22 |
| 29 | G | GA | 38 | 13 | 10 | 5 | 0 | 34 |
| 30 | G | GA | 48 | 12 | 18 | 4 | 0 | 18 |
| 31 | G | GA | 63 | 12 | 9 | 5 | 0 | 11 |
| 32 | H | GA | 47 | 9 | 18 | 1 | 0 | 25 |
| 33 | I | GA | 31 | 12 | 25 | 2 | 0 | 30 |
| 34 | J | GA | 45 | 27 | 10 | 6 | 0 | 12 |
| 35 | K | GA | 30 | 0 | 39 | 8 | 0 | 14 |
| 36 | L | GA | 12 | 12 | 51 | 2 | 0 | 23 |
| 37 | M | GA | 16 | 7 | 55 | 1 | 0 | 21 |
| 38 | M | GA | 0 | 7 | 70 | 0 | 0 | 23 |
| 39 | M | GI | 17 | 9 | 55 | 1 | 0 | 18 |
| 40 | N | GA | 13 | 9 | 64 | 1 | 0 | 13 |
| 41 | N | GA | 15 | 10 | 58 | 5 | 0 | 12 |
| 42 | N | GI | 9 | 10 | 52 | 3 | 0 | 26 |
| 43 | O | GI | 20 | 8 | 60 | 0 | 0 | 12 |
| 44 | P | GA | 22 | 2 | 50 | 1 | 0 | 25 |
| 45 | Q | GA | 17 | 3 | 36 | 2 | 0 | 42 |
| 46 | R | GA | 66 | 10 | 0 | 2 | 0 | 22 |
| 47 | S | GA | 9 | 6 | 66 | 12 | 0 | 7 |
| 48 | T | GA | 8 | 25 | 38 | 6 | 0 | 23 |
| 49 | U | GA | 18 | 7 | 62 | 12 | 0 | 1 |
| 50 | V | GA | 70 | 9 | 0 | 12 | 0 | 9 |
| 51 | D | GA | 23 | 12 | 20 | 8 | 0 | 30 |
| 52 | D | GA | 34 | 11 | 0 | 24 | 0 | 31 |
| 53 | D | GA | 26 | 11 | 24 | 6 | 0 | 33 |
| 54 | D | GA | 20 | 10 | 65 | 3 | 0 | 2 |

TABLE 3-2-continued

| | Microstructure | | Mechanical properties | | | | Toughness | |
| | Fresh martensite after prestrain | Tempered martensite | Press formability | | | | | |
| No. | (≥2 μm) / % | (≥5 μm) / 1000 μm² | TS MPa | El % | λ % | TS*El*λ^0.5 / 1000 | after prestrain | Remarks |
|---|---|---|---|---|---|---|---|---|
| 28 | 5 | 3 | 1005 | 21.6 | 37 | 132 | Very good | Ex |
| 29 | 5 | 1 | 982 | 23.0 | 28 | 120 | Very good | Ex |
| 30 | 9 | 5 | 1013 | 22.0 | 21 | 102 | Very good | Ex. |
| 31 | 12 | 0 | 950 | 23.8 | 27 | 117 | Poor | Comp. ex. |
| 32 | 4 | 1 | 995 | 23.2 | 26 | 118 | Very good | Ex. |
| 33 | 4 | 3 | 1024 | 23.6 | 33 | 139 | Very good | Ex. |
| 34 | 10 | 0 | 1045 | 30.1 | 16 | 126 | Good | Ex. |
| 35 | 9 | 1 | 1078 | 20.6 | 15 | 86 | Good | Ex. |
| 36 | 6 | 9 | 1003 | 25.0 | 28 | 133 | Very good | Ex. |
| 37 | 2 | 12 | 1236 | 14.2 | 51 | 125 | Very good | EX. |
| 38 | 0 | 12 | 1259 | 12.1 | 60 | 118 | Very good | Ex |
| 39 | 2 | 12 | 1225 | 14.7 | 49 | 126 | Very good | Ex. |
| 40 | 2 | 11 | 1198 | 15.0 | 41 | 115 | Very good | Ex. |
| 41 | 8 | 9 | 1202 | 15.5 | 30 | 102 | Very good | Ex |
| 42 | 3 | 10 | 1184 | 14.8 | 41 | 112 | Very good | Ex |
| 43 | 1 | 11 | 1221 | 14.9 | 50 | 129 | Very good | Ex |
| 44 | 1 | 4 | 891 | 13.1 | 30 | 64 | Very good | Comp. ex. |
| 45 | 2 | 4 | 1097 | 12.0 | 31 | 73 | Very good | Comp. ex. |
| 46 | 0 | 0 | 701 | 31.5 | 48 | 153 | Very good | Comp. ex. |
| 47 | 13 | 23 | 1374 | 12.0 | 18 | 70 | Poor | Comp. ex. |
| 48 | 14 | 11 | 1310 | 20.4 | 19 | 116 | Poor | Comp. ex. |
| 49 | 15 | 21 | 1233 | 15.8 | 18 | 83 | Poor | Comp. ex. |
| 50 | 13 | 0 | 901 | 22.9 | 16 | 83 | Poor | Comp. ex. |
| 51 | 12 | 3 | 1095 | 18.3 | 19 | 87 | Poor | Comp. ex |
| 52 | 26 | — | 1121 | 15.7 | 18 | 75 | Poor | Comp. ex. |
| 53 | 9 | 2 | 1046 | 20.5 | 23 | 103 | Good | Ex. |
| 54 | 10 | 23 | 1191 | 19.8 | 21 | 108 | Poor | Comp. ex. |

Bold underlines indicate outside scope of present invention.

In Comparative Example 2, the second cooling stop temperature in the hot dip galvanizing step was higher than 150° C. As a result, the desired metallic structure could not be obtained and the press formability and toughness after prestraining were poor. In Comparative Example 3, the holding time of the third soaking treatment in the hot dip galvanizing step was more than 1000 seconds. As a result, the desired metallic structure could not be obtained and the press formability was poor. In Comparative Example 4, the slab heating rate was less than 2° C./min. As a result, the desired metallic structure could not be obtained and the toughness after prestraining was poor. In Comparative Example 7, the temperature of the first soaking treatment in the hot dip galvanizing step was less than Ac1+30° C. (812° C.). As a result, the desired metallic structure could not be obtained and the press formability was poor. In Comparative Example 8, the first pass inlet side temperature of the finish rolling in the hot rolling step was less than 1000° C. and the final pass exit side temperature was less than 900° C. As a result, the desired metallic structure could not be obtained and the toughness after prestraining was poor. In Comparative Example 11, the temperature of the third soaking treatment in the hot dip galvanizing step was less than 300° C. As a result, the desired metallic structure could not be obtained and the press formability and toughness after prestraining were poor. In Comparative Example 12, the average cooling rate of the first cooling in the hot dip galvanizing step was less than 10° C./s. As a result, the desired metallic structure could not be obtained and the press formability was poor. In Comparative Example 15, the holding time of the third soaking treatment was less than 100 seconds. As a result, the desired metallic structure could not be obtained and the toughness after prestraining was poor.

In Comparative Example 16, the temperature of the third soaking treatment in the hot dip galvanizing step was higher than 420° C. As a result, the desired metallic structure could not be obtained and the toughness after prestraining was poor. In Comparative Example 17, the holding time of the second soaking treatment in the hot dip galvanizing step was more than 500 seconds. As a result, the desired metallic structure could not be obtained and the press formability was poor. In Comparative Example 18, the temperature of the second soaking treatment was more than 480° C. As a result, the desired metallic structure could not be obtained and the toughness after prestraining was poor. In Comparative Example 21, the holding time of the second soaking treatment in the hot dip galvanizing step was less than 80 seconds. As a result, the desired metallic structure could not be obtained and the toughness after prestraining was poor. In Comparative Example 22, the maximum rolling reduction of the finish rolling in the hot rolling step was more than 37% and the average time between stands was less than 0.20 second. As a result, the desired metallic structure could not be obtained and the toughness after prestraining was poor. In Comparative Example 27, the time from the end of the finish rolling to the start of cooling was less than 1 second. As a result, the desired metallic structure could not be obtained and the toughness after prestraining was poor. In Comparative Example 31, the coiling temperature in the hot rolling step was more than 680° C. As a result, the desired metallic structure could not be obtained and the press formability and toughness after prestraining were poor. In Comparative Examples 44 to 50, the chemical compositions were not controlled to within the predetermined ranges, so the press formability and/or toughness after prestraining were poor. In Comparative Example 51, the average heating rate from Ac1 to Ac1+30° C. in the hot dip galvanizing step was less than 0.5 second. As a result, the desired metallic structure could not be obtained and the toughness after prestraining was poor. In Comparative Example 52, the third soaking treatment was omitted, so the desired metallic structure could not be obtained and the press formability and toughness after prestraining were poor. In Comparative Example 54, the second soaking treatment was omitted, so the desired metallic structure could not be obtained and the toughness after prestraining was poor.

In contrast to this, the hot dip galvanized steel sheets of the examples have a tensile strength of 980 MPa or more and TS×El×$\lambda^{0.5}$/1000 of 80 or more and, further have excellent toughness after prestraining, so it is learned that they are excellent in press formability and toughness after press forming.

Example B

In this example, the inventors studied the presence or absence of a specific soaking treatment. First, they prepared a slab having the chemical composition shown in Table 1, then, as shown in Table 4, made the first cooling gradual cooling to eliminate the second soaking treatment. Other than that, the same procedure was followed as the case of Example A to obtain hot dip galvanized steel sheet. The steel structures and mechanical properties in the obtained hot dip galvanized steel sheet were investigated by methods similar to the case of Example A. The results are shown in Table 5. In the different soaking treatments shown in Table 4, the temperature was maintained within a range of the temperature shown in Table 4±10° C.

TABLE 4-1

| | | | Hot rolling step | | | | | | | Cold rolling step |
|---|---|---|---|---|---|---|---|---|---|---|
| No. | Steel type | Slab heating temp. ° C. | Slab heating rate (Ac1~Ac1 + 30° C.) ° C./min | Total rolling reduction of rough rolling at 1050° C. or more % | Finish inlet side temp. ° C. | Finish exit side temp. ° C. | Maximum rolling reduction % | Average time between stands s | Time from end of finish rolling to start of cooling s | Coiling temp. ° C. | Cold rolling reduction % |
| 55 | A | 1230 | 5 | 88 | 1050 | 950 | 20 | 0.4 | 3 | 600 | 56 |

Bold underlines indicate outside scope of present invention.

TABLE 4-2

| | Hot dip galvanizing step | | | | | | | | |
|---|---|---|---|---|---|---|---|---|---|
| | Heating | | | | First cooling | | | | Third soaking |
| | Heating rate between 600° C.-Ac1 ° C./s | Heating rate between Ac1-Ac1 + 30° C. ° C./s | First soaking | | Average cooling rate between 700~cooling stop temp. ° C./s | Cooling stop temp. ° C. | Alloying | | Holding time s |
| No. | | | Temp. ° C. | Holding time s | | | Alloying temp. ° C. | Temp. ° C. | |
| 55 | 4.8 | 1.5 | 820 | 90 | 2 | 80 | 485 | 400 | 180 |

Bold underlines indicate outside scope of present invention.

TABLE 5

| | | | Microstructure | | | | | |
|---|---|---|---|---|---|---|---|---|
| No | Steel type | Coating | Ferrite % | Retained austenite % | Tempered martensite % | Fresh martensite % | Pearlite + cementite % | Bainite % |
| 55 | A | GA | 40 | 8 | 6 | 9 | 6 | 31 |

| | Microstructure | | Mechanical properties | | | | | |
|---|---|---|---|---|---|---|---|---|
| | Fresh martensite after prestrain | Tempered martensite | Press formability | | | | Toughness | |
| No | (≥2 μm) % | (≥5 μm)/ 1000 μm² | TS MPa | El % | λ % | TS*El*$\lambda^{0.5}$/ 1000 | after prestrain | Remarks |
| 55 | 12 | 2 | 1010 | 19.6 | 20 | 89 | Poor | Comp. ex. |

Bold underlines indicate outside scope of present invention.

As clear from the results of Table 5, if making the first cooling gradual cooling to eliminate second soaking treatment, the desired metallic structure could not be obtained and the toughness after prestraining was poor.

The invention claimed is:

1. A hot dip galvanized steel sheet comprising a base steel sheet and a hot dip galvanized layer on at least one surface of the base steel sheet, wherein the base steel sheet has a chemical composition comprising, by mass %,
   - C: 0.100% to 0.350%,
   - Si: 0.50% to 2.50%,
   - Mn: 1.00% to 3.50%,
   - P: 0.050% or less,
   - S: 0.0100% or less,
   - Al: 0.001% to 1.500%,
   - N: 0.0100% or less,
   - O: 0.0100% or less,
   - Ti: 0% to 0.200%,
   - V: 0% to 1.00%,
   - Nb: 0% to 0.100%,
   - Cr: 0% to 2.00%,
   - Ni: 0% to 1.00%,
   - Cu: 0% to 1.00%,
   - Co: 0% to 1.00%,
   - Mo: 0% to 1.00%,
   - W: 0% to 1.00%,
   - B: 0% to 0.0100%,
   - Sn: 0% to 1.00%,
   - Sb: 0% to 1.00%,
   - Ca: 0% to 0.0100%,
   - Mg: 0% to 0.0100%,
   - Ce: 0% to 0.0100%,
   - Zr: 0% to 0.0100%,
   - La: 0% to 0.0100%,
   - Hf: 0% to 0.0100%,
   - Bi: 0% to 0.0100%,
   - REM other than Ce and La: 0% to 0.0100% and
   - a balance of Fe and impurities,
   a steel microstructure at a range of 1/8 thickness to 3/8 thickness centered about a position of 1/4 thickness from a surface of the base steel sheet contains, by volume fraction,
   - ferrite: 0% to 50%,
   - retained austenite: 6% to 30%,
   - bainite: 5% or more,
   - tempered martensite: 5% or more,
   - fresh martensite: 0% to 10%, and
   - pearlite and cementite in total: 0% to 5%,
   a number density of tempered martensite with a circle equivalent diameter of 5.0 μm or more is 20/1000 μm$^2$ or less, and
   an area ratio of fresh martensite with a circle equivalent diameter of 2.0 μm or more after imparting 5% plastic strain is 10% or less.

2. A method for producing the hot dip galvanized steel sheet according to claim 1, comprising:
   (A) a hot rolling step comprising heating a slab having the chemical composition according to claim 1 and finish rolling the heated slab by a plurality of rolling stands then coiling it up, wherein the hot rolling step satisfies the conditions of the following (A1) to (A3):
   (A1) an average heating rate from Ac1 to Ac1+30° C. at the time of heating the slab is 2 to 50° C./min,
   (A2) in the finish rolling by the plurality of rolling stands, a rolling reduction per pass is 37% or less, a first pass inlet side temperature is 1000° C. or more, a final pass exit side temperature is 900° C. or more, an average time between stands is 0.20 second or more, and a time from an end of finish rolling to a start of cooling is 1 second or more, and
   (A3) a coiling temperature is 450 to 680° C., and
   (B) a hot dip galvanizing step comprising heating the obtained steel sheet to first soak it, first cooling then second soaking the first soaked steel sheet, dipping the second soaked steel sheet in a hot dip galvanizing bath, second cooling the coated steel sheet, and heating the second cooled steel sheet then third soaking it, wherein the hot dip galvanizing step satisfies the conditions of the following (B1) to (B6):
   (B1) in the heating of the steel sheet before the first soaking, an average heating rate from Ac1 to Ac1+ 30° C. is 0.5° C./s or more,
   (B2) the steel sheet is held at a maximum heating temperature of Ac1° C.+30° C. to 950° C. for 1 second to 1000 seconds (first soaking),
   (B3) an average cooling rate in a temperature range of 700 to 600° C. at the first cooling is 10 to 100° C./s,
   (B4) the first cooled steel sheet is held in a range of 250 to 480° C. for 80 seconds to 500 seconds (second soaking),
   (B5) the second cooling is performed down to 150° C. or less, and
   (B6) the second cooled steel sheet is heated to a temperature region of 300 to 420° C., then held in the temperature region for 100 to 1000 seconds (third soaking).

* * * * *